(12) United States Patent
Koo

(10) Patent No.: US 11,656,827 B2
(45) Date of Patent: May 23, 2023

(54) PRIVACY FILTER

(71) Applicant: SEWHA Co., Ltd, Seongnam-si (KR)

(72) Inventor: Bon-Chul Koo, Seongnam-si (KR)

(73) Assignee: SEWHA CO., LTD, Seongnam-si (KR)

( * ) Notice: Subject to any disclaimer, the term of this patent is extended or adjusted under 35 U.S.C. 154(b) by 206 days.

(21) Appl. No.: 17/155,599

(22) Filed: Jan. 22, 2021

(65) Prior Publication Data

US 2021/0397395 A1    Dec. 23, 2021

(30) Foreign Application Priority Data

Jun. 22, 2020   (KR) ........................ 10-2020-0075583

(51) Int. Cl.
| | | |
|---|---|---|
| *G06F 3/14* | (2006.01) | |
| *G09G 5/14* | (2006.01) | |
| *G02B 5/20* | (2006.01) | |
| *G02B 5/22* | (2006.01) | |

(52) U.S. Cl.
CPC ............... *G06F 3/14* (2013.01); *G02B 5/201* (2013.01); *G02B 5/22* (2013.01); *G09G 5/14* (2013.01); *G09G 2354/00* (2013.01)

(58) Field of Classification Search
None
See application file for complete search history.

(56) References Cited

U.S. PATENT DOCUMENTS

| | | |
|---|---|---|
| 5,227,916 A | 7/1993 | Theirl et al. |
| 5,746,408 A | 5/1998 | Theirl et al. |
| 2007/0258198 A1 | 11/2007 | Minaguchi et al. |
| 2012/0033304 A1 | 2/2012 | Kim |
| 2018/0276418 A1 | 9/2018 | Li |

FOREIGN PATENT DOCUMENTS

| | | | | |
|---|---|---|---|---|
| CN | 106415390 A | * | 2/2017 | ......... G02B 27/0101 |
| CN | 209149309 U | | 7/2019 | |
| CN | 210148867 U | | 3/2020 | |
| EP | 0879532 B1 | | 10/2001 | |
| JP | 2002-303707 A | | 10/2002 | |
| JP | 2005-79008 A | | 3/2005 | |

(Continued)

OTHER PUBLICATIONS

Sharki, "Simply setting up a station type filter for blocking a blue light on monitor", May 18, 2019, <https://blog.naver.com/vldzmgid/221540333917>, with English Translation.

(Continued)

*Primary Examiner* — Elmito Breval
(74) *Attorney, Agent, or Firm* — Hauptman Ham, LLP

(57) ABSTRACT

A privacy filter includes a base having a shape corresponding to a shape of an adherend and formed in a sheet form, a micro-louver portion stacked on one face of the base, wherein the micro-louver portion has a louver pattern in which a light transmitting layer and an opaque layer are alternately arranged with each other in a repeated manner, a first coating formed on one face of the micro-louver portion, a second coating formed on an opposite face of the base to one face of the base, and a foam pad stacked on one face of the second coating, wherein the foam pad is to be adhered to the adherend, and has a predetermined thickness.

13 Claims, 7 Drawing Sheets

(56) References Cited

FOREIGN PATENT DOCUMENTS

| | | |
|---|---|---|
| JP | 2009-222996 A | 10/2009 |
| JP | 2010-56520 A | 3/2010 |
| KR | 1999-0083385 A | 11/1999 |
| KR | 20-0423548 Y1 | 8/2006 |
| KR | 10-2006-0123797 A | 12/2006 |
| KR | 10-2014-0064220 A | 5/2014 |
| KR | 10-1550004 B1 | 9/2015 |
| KR | 10-2017-0123474 A | 11/2017 |
| WO | 97/28647 A1 | 8/1997 |

OTHER PUBLICATIONS

Sewha P&C, "Privacy Filter", Nov. 29, 2019, <http://shehwa.co.kr/project/privacy-film/>, with English Translation.
Pritaa, "[RockYoun Tech] POLANI Blue Light Filter 27 [635X415] Stationary Filter", 2020, <http://pritaa.kr/shop/item.php?it_id=MP20191223092204864/>, with Partial English Translation.
The extended European Search Report dated Jun. 25, 2021 for corresponding European Patent Application No. 21150733.0.

* cited by examiner

PRIVACY FILTER

CROSS-REFERENCE TO RELATED APPLICATION

This application claims a benefit under 35 U.S.C. § 119(a) of Korean Patent Application No. 10-2020-0075583 filed on Jun. 22, 2020, on the Korean Intellectual Property Office, the entire disclosure of which is incorporated herein by reference for all purposes.

BACKGROUND

1. Field

Embodiments of the present disclosure relate to a privacy filter, and more particularly, to a privacy filter with improved attachment/detachment and shock absorbing functions.

2. Description of Related Art

In recent years, as a demand for protection of personal privacy increases, various related products are being developed in various places. Among products that guarantee the personal privacy, a product that is attached to a display of a laptop, a computer, or the like to block side transmission of light and limits an angle of field to be within a predetermined angle is referred to as a privacy filter (or a security film).

The privacy filter refers to a product in a form of a film that is located on a top and bottom face of the display to prevent others from peeping at a screen or a content of the screen. The privacy filter allows only a user to see a clear screen, which is made possible by controlling a wide angle of field formed on a surface of the display.

However, in a case of a conventional privacy filter, a scheme of mounting the privacy filter after installing a hang tab, which is separate filter mounting means, around the display, or a scheme of attaching the privacy filter after attaching a double-sided tape around the display was used. However, when using the hang tab or the double-sided tape, an attachment/detachment operation of the privacy filter was complicated. In addition, when a foreign substance of an adhesive remains on a surface of the privacy filter or a display device, it was difficult to maintain a clean appearance of the device.

In one example, a scheme of using a magnetic force was introduced as another solution to fix the privacy filter on the display. However, although there was an advantage that a simple attachment/detachment operation is available, but there were disadvantages that a manufacturing method is complicated, and a shock may be applied to the device because of a hard magnet portion.

Therefore, it is necessary to develop a privacy filter that is easy to be attached and detached, is excellent to secure the clean appearance of the device because of not using a separate mounting mechanism or adhesive, and is able to protect the product from the external shock by having a certain level of shock absorption function.

As a prior art document related to the present disclosure, Korean Patent No. 10-1550004 (issuance date: 2015 Aug. 28) discloses the security film. However, in the conventional security film disclosed therein, there is no suggestion at all in relation to the attachment/detachment of the security film, the securing of the cleanliness of the product, and the shock absorption function against the external force.

PRIOR ART DOCUMENT

Patent Document

Korean Patent No. 10-155004 (issuance date: 2015 Aug. 28)

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a privacy filter that is easy to be attached and detached to a display device, and that is able to maintain a clean appearance of the device by not using a separate mounting device or an adhesive.

Another purpose of the present disclosure is to provide a privacy filter that, when applied to a device such as a laptop or the like, has a cushion function of absorbing a shock when folding the device, and when applied to various devices with other displays, absorbs an external shock to protect a screen.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

The privacy filter according to an aspect of the present disclosure for achieving one of the above purposes may be easy to be attached to and detached from the display device, and may maintain the clean appearance of the device by not using the separate mounting mechanism or the adhesive.

A first aspect of the present disclosure provides a privacy filter including a base having a shape corresponding to a shape of an adherend and formed in a sheet form, a micro-louver portion stacked on one face of the base, wherein the micro-louver portion has a louver pattern in which a light transmitting layer and an opaque layer are alternately arranged with each other in a repeated manner, a first coating formed on one face of the micro-louver portion, a second coating formed on an opposite face of the base to one face of the base, and a foam pad stacked on one face of the second coating, wherein the foam pad is to be adhered to the adherend, and has a predetermined thickness.

In one implementation of the privacy filter of the first aspect, the filter may further include a first protective film stacked on one face of the first coating. The first protective film may have a black color, and have a shape and a size respectively corresponding to a shape and a size of the foam pad.

In one implementation of the privacy filter of the first aspect, the filter may further include a second protective film stacked on one face of the foam pad.

In one implementation of the privacy filter of the first aspect, the micro-louver portion may be formed by alternately stacking a transparent resin and an opaque ink portion with each other in a repeated manner to form a stacked structure, and then cutting the stacked structure in a vertical direction perpendicular to a stacking direction. This is referred to as a slicing scheme.

In one implementation of the privacy filter of the first aspect, the micro-louver portion may be shaped by molding a plurality of grooves corresponding to the louver pattern in the prepared transparent resin, and then filling the plurality of grooves respectively with the opaque ink portions. This is referred to as a molding scheme.

In one implementation of the privacy filter of the first aspect, the filter may further include a bonding portion formed on one face of the micro-louver portion, and a coating base in a form of a sheet formed on one face of the bonding portion. The first coating may be coated on one face of the coating base, and include at least one coating selected from a group consisting of anti-glare, hard coating, slip coating, and antibacterial functional coating. The second coating may include at least one coating selected from a group consisting of anti-glare, hard coating, and glossy coating.

In one implementation of the privacy filter of the first aspect, the bonding portion may include a UV bonding adhesive, and have blue light cut and EMI cut functions.

In one implementation of the privacy filter of the first aspect, the foam pad may be made of at least one polymer material selected from a group consisting of polyethylene, polystyrene, and polyurethane.

In one implementation of the privacy filter of the first aspect, the foam pad may be attached to the adherend using a micropore layer of a size (a pore area) in a range of 30 to 100 um$^2$ without an additional adhesive coating.

In one implementation of the privacy filter of the first aspect, the thickness of the foam pad may be in a range of 0.2 to 10 mm.

A second aspect of the present disclosure provides a privacy filter including a base including a first base body corresponding to a screen of a display device and having an area corresponding to an area of the screen, and a second base body extending from a top of the first base body in a perpendicular manner to the first base body, wherein the second base body is mounted on a top of the display device, wherein the second base body includes at least one connection face in a face-contact with the top of the display device, a micro-louver portion stacked on one face of the first base body, wherein the micro-louver portion has a louver pattern in which a light transmitting layer and an opaque layer are alternately arranged with each other in a repeated manner, a first coating formed on one face of the micro-louver portion, a second coating formed on an opposite face of the first base body to one face thereof, and a foam pad formed on at least a portion of the connection face, wherein the foam pad has a predetermined thickness, wherein the foam pad is attached to the top of the display device when the second base body is mounted on the top of the display device.

In one implementation of the privacy filter of the second aspect, the filter may further include a first protective film stacked on one face of the first coating, and a second protective film stacked on one face of the second coating.

In one implementation of the privacy filter of the second aspect, the micro-louver portion may be formed by alternately stacking a transparent resin and an opaque ink portion with each other in a repeated manner to form a stacked structure, and then cutting the stacked structure in a vertical direction perpendicular to a stacking direction.

In one implementation of the privacy filter of the second aspect, the micro-louver portion may be shaped by molding a plurality of grooves corresponding to the louver pattern in the prepared transparent resin, and then filling the plurality of grooves respectively with the opaque ink portions. With such scheme, a pattern shape may be controlled by ultra-precise machining. In addition, the louver pattern may be formed by adjusting a color of the resin in the groove. In addition, a clean appearance may be provided. In the case of the slicing scheme, it may be difficult to control thickness uniformity of the material.

In one implementation of the privacy filter of the second aspect, the filter may further include a bonding portion formed on one face of the micro-louver portion, and a coating base in a form of a sheet formed on one face of the bonding portion. The first coating may be coated on one face of the coating base, and include at least one coating selected from a group consisting of anti-glare, hard coating, slip coating, and antibacterial functional coating. The second coating may include at least one coating selected from a group consisting of anti-glare, hard coating, and glossy coating. The bonding portion may have blue light cut and EMI cut functions.

In one implementation of the privacy filter of the second aspect, the foam pad may be made of at least one polymer material selected from a group consisting of polyethylene, polystyrene, and polyurethane.

In one implementation of the privacy filter of the second aspect, the foam pad may include at least two circular pads arranged and spaced from each other by a predetermined spacing in a left and right direction of the connection face.

According to the present disclosure, the privacy filter may be easily attached to and detached from the display device using the foam pad (e.g., a urethane nano foam material and the like) having a function of being attached to the adherend. In addition, there is an advantage in maintaining the clean appearance of the display device as it is not necessary to separately use mounting means such as a hang tab and the like or an adhesive material such as a double-sided tape and the like.

In addition, according to the present disclosure, when the privacy filter is applied to the device such as the laptop or the like, the foam pad having the predetermined thickness may provide the cushion function of protecting the screen by absorbing the shock occurred when folding the device. In addition, when the privacy filter is applied to the various devices with the displays, the foam pad having the predetermined thickness may absorb the external shock applied to the display to protect the screen.

In addition, according to the present disclosure, the appearance of the device may be protected and contamination of the device may be prevented using the foam pad with micropores having a size equal to or less than a predetermined size. In addition, when the attachment function is deteriorated because of a foreign substance, the foam pad may be washed and used repeatedly, which has an advantage of being able to be used for a long time.

In addition to the effects as described above, specific effects of the present disclosure will be described together with the detailed description for carrying out the disclosure.

DETAILED DESCRIPTIONS

Figure 1:
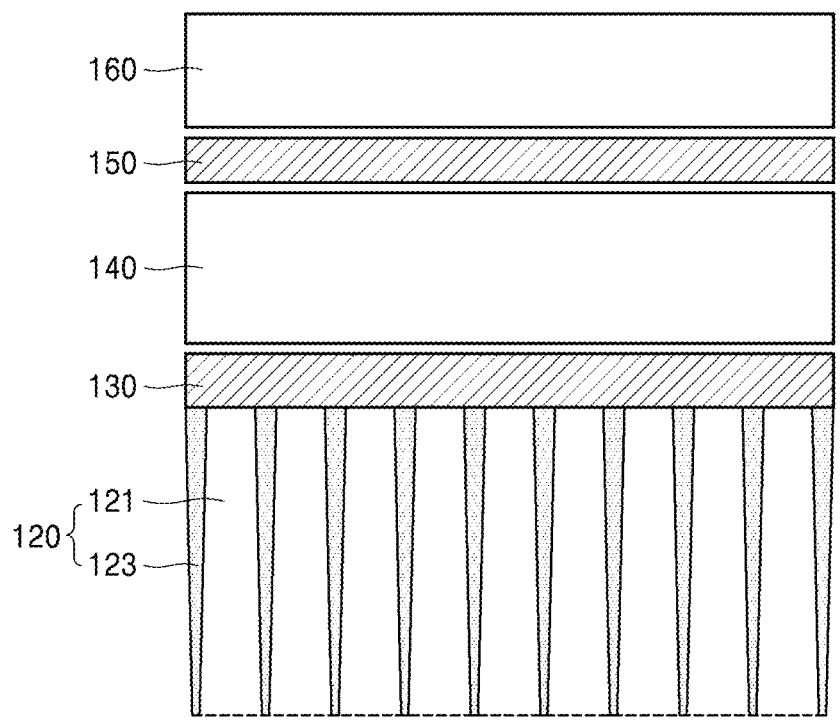
FIG. 1 is a schematic cross-sectional view of a privacy filter according to an embodiment of the present disclosure.
Figure 1:
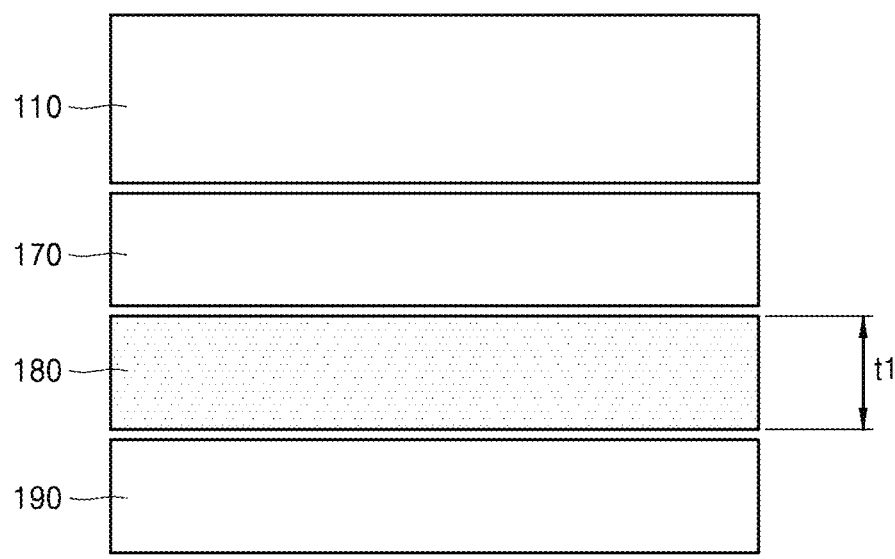

For simplicity and clarity of illustration, elements in the figures are not necessarily drawn to scale. The same reference numbers in different figures denote the same or similar elements, and as such perform similar functionality. Moreover, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

The terms "about", "substantially", etc. in the present disclosure are used to indicate inherent preparation and substance related tolerance. This is intended to prevent an unscrupulous infringer to design around accurate or absolute values set forth to aid understanding of the present disclosure. The term "step of ~" used throughout the present disclosure does not mean "step for ~".

Throughout the present disclosure, the term "combination thereof" included in expression of a Makushi form means a mixture or combination of at least two selected from a group consisting of elements as recited in the expression of the Makushi form.

Hereinafter, a privacy filter according to an embodiment of the present disclosure will be described in detail with reference to the accompanying drawings.

The privacy filter of the present disclosure may have a first embodiment (an attached type) attached to a front face of a screen of a display and a second embodiment (a mounted type) mounted on a top of a display device.

First Embodiment of Privacy Filter

Figure 2:
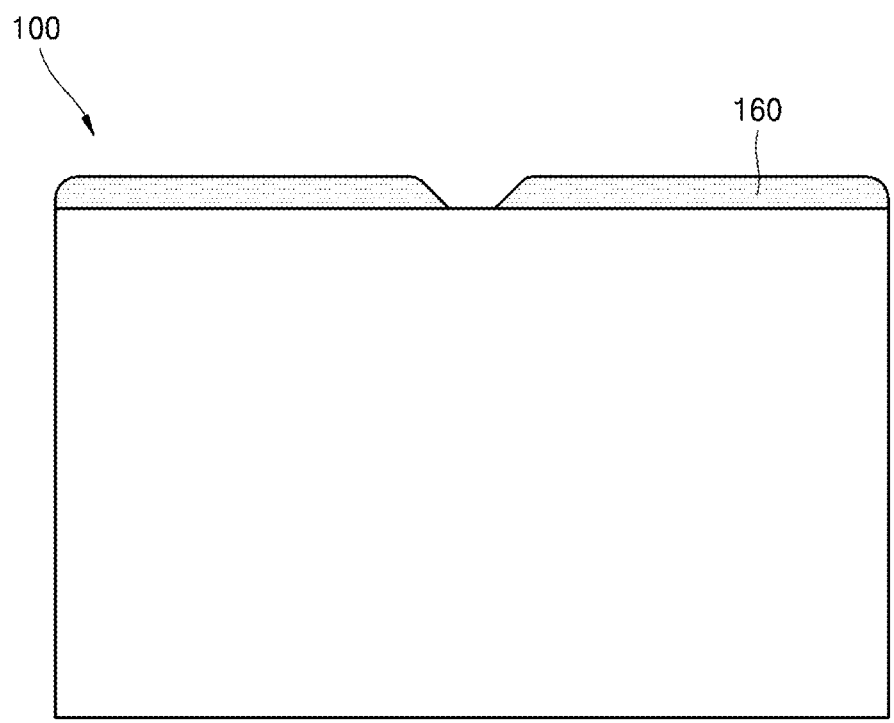
FIGS. 2 and 3 are a front view and a rear face view of a privacy filter according to an embodiment of the present disclosure.
Figure 3:
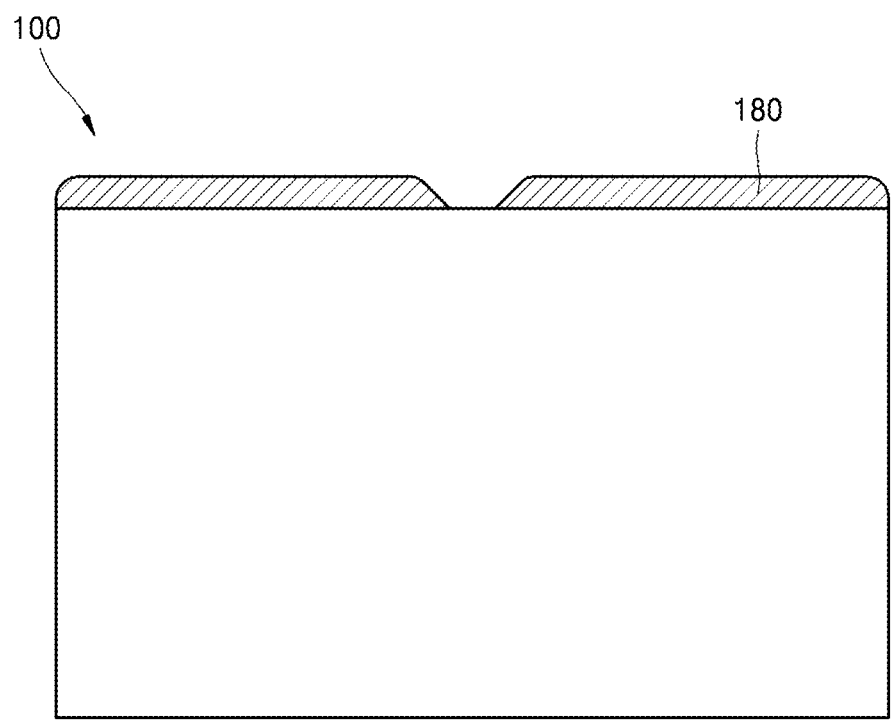
Figure 4:
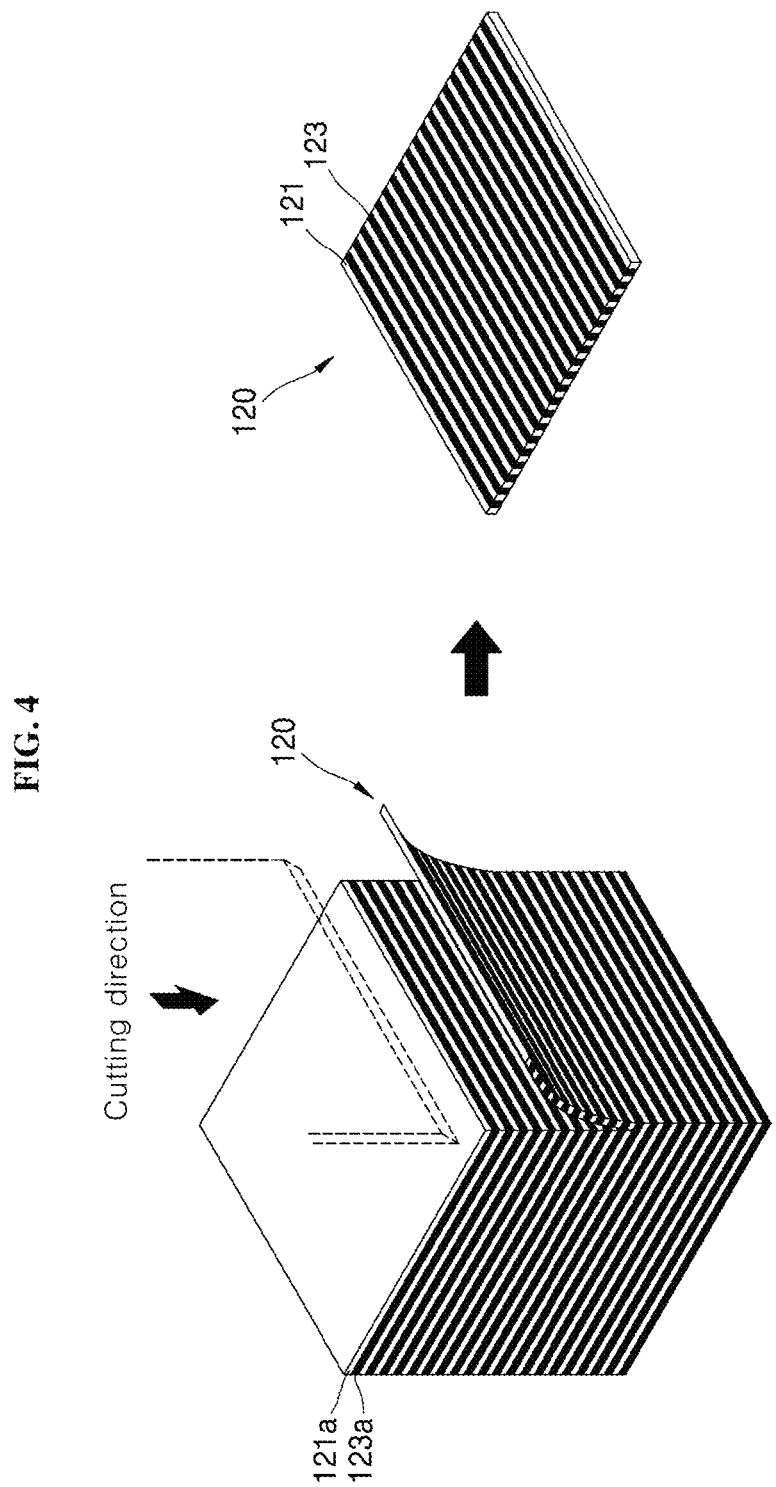
FIGS. 4 and 5 are diagrams showing a manufacturing process of a micro-louver portion of a privacy filter according to an embodiment of the present disclosure.
Figure 5:
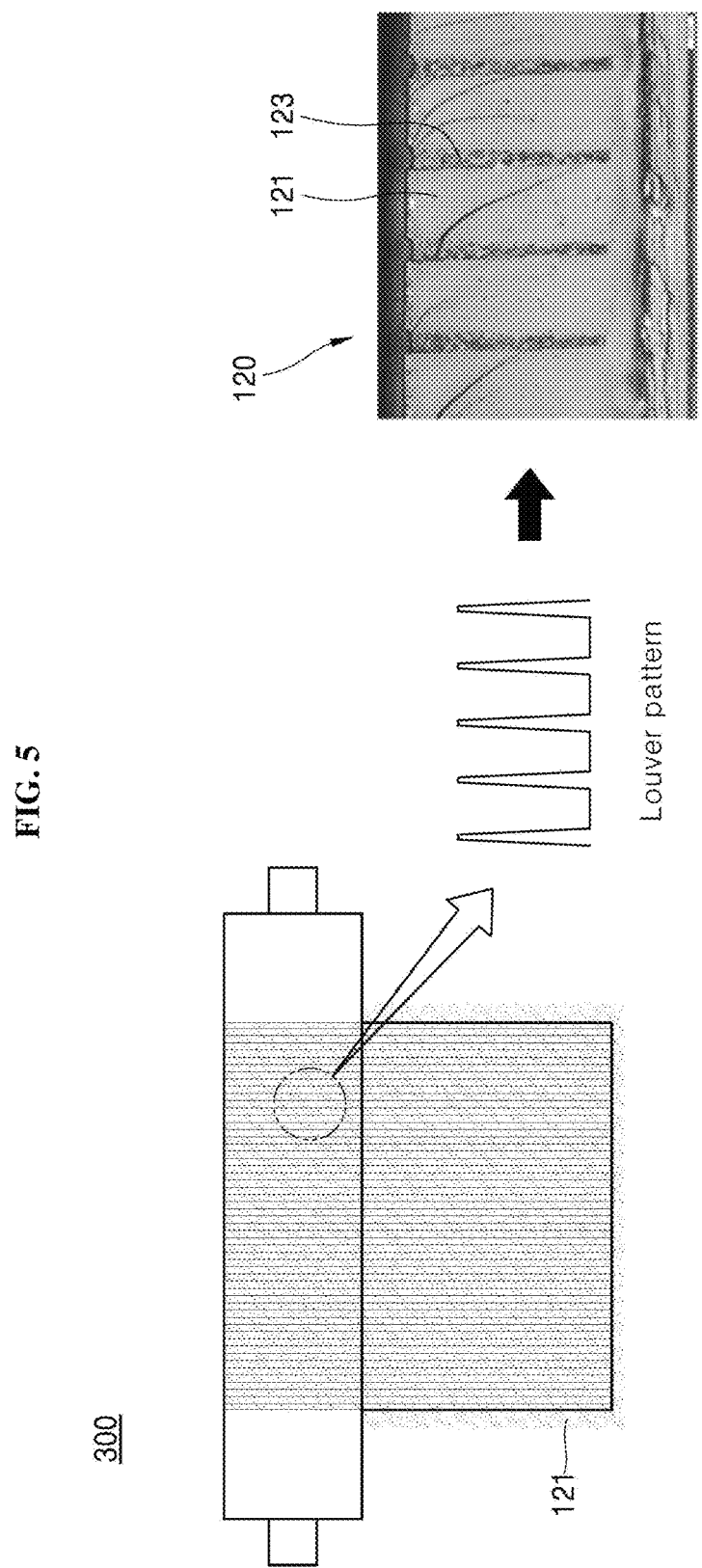

FIG. 1 is a schematic cross-sectional view of a privacy filter according to an embodiment of the present disclosure. FIGS. 2 and 3 are a front view and a rear face view of a privacy filter according to an embodiment of the present disclosure. FIGS. 4 and 5 are diagrams showing a manufacturing process of a micro-louver portion of a privacy filter according to an embodiment of the present disclosure.

A privacy filter 100 according to an embodiment of the present disclosure is a structure that is easy to be attached to and detached from various devices (hereinafter, referred to as display devices) having a display, which may be attached to a front face of a screen of a display and may be removed therefrom when necessary. In this connection, the display device refers to a device equipped with the display such as a laptop, a monitor, a TV, and the like.

The privacy filter 100 includes a base 110, a micro-louver portion 120, a bonding portion 130, a coating base 140, a first coating 150, a first protective film 160, a second coating 170, a foam pad 180, and a second protective film 190.

The base 110 may be a sheet of a PET material having a size and a shape respectively corresponding to a size and a shape of a screen of an adherend, for example, the display device.

The micro-louver portion 120 is stacked on one face of the base 110. In this connection, said one face of the base 110 may be a front face of the base 110.

As a specific example, the micro-louver portion 120 has a louver pattern in which a light transmitting layer 121 and an opaque layer 123 are alternately arranged with each other in a repeated manner.

The first coating 150 is formed on one face of the micro-louver portion 120. In this connection, said one face of the micro-louver portion 120 may be a front face of the micro-louver portion 120.

The second coating 170 is formed on an opposite face of the base 110 to said one face thereof. In this connection, the opposite face of the base 110 to said one face thereof may be a rear face of the base 11.

The foam pad 180 may be stacked on one face of the second coating 170, may be attached to the adherend, and may have a predetermined thickness t1. In this connection, said one face of the second coating 170 may be a rear face of the second coating 170.

Specifically, the foam pad 180 may be made of at least one polymer material among polyethylene, polystyrene, and polyurethane. However, the present disclosure may not be limited thereto, and the foam pad 180 may use various materials similar to those that are well-known to a person skilled in the art.

As a specific example, the foam pad 180, which is referred to as a 'nano pad' or a 'nano suction foam', has a layer in which micropores of a predetermined size are formed (hereinafter, referred to as a micropore layer), thereby having a strong adsorptive force when being attached to a smooth surface using multiple micropore layers not visible to the naked eye. Accordingly, the foam pad 180 may be attached to the adherend (e.g., the display device and the like) without a separate adhesive coating.

In addition, the foam pad 180 is formed to have the predetermined thickness, thereby absorbing an external shock at a position between an attachment face of the adherend and the privacy filter, and providing a cushion function of protecting the adherend, that is, the screen of the display device or the like.

For example, it is preferable that the foam pad 180 has the micropore layer having a size (a pore area) in a range of 30 to 100 um$^2$.

When the size of the micropore layer of the foam pad 180 is less than 30 um$^2$, as the size of the micropore layer itself becomes too small, the adsorptive force exerted through each micropore layer may decrease. For this reason, there may be a difficulty in exerting an adhesive force required for the attachment of the privacy filter 100. Conversely, when the size of the micropore layer of the foam pad 180 exceeds 100 um$^2$, the adsorptive force exerted through each micropore layer may be improved, but the number of micropore layers for unit area of the foam pad 180 may decrease. For this reason, there may be the difficulty in exerting the adhesive force required for the attachment of the privacy filter 100. Therefore, it is preferable that the foam pad 180 has the micropore layer having the size in a range of 30 to 100 um$^2$.

For example, the thickness t1 of the foam pad 180 is preferably in a range of 0.2 to 10 mm.

When the thickness t1 of the foam pad 180 is less than 0.2 mm, as the thickness of the foam pad 180 becomes too small, the shock absorbing cushion function for protecting the privacy filter 100 from the external shock may be insufficient. Conversely, when the thickness t1 of the foam pad 180 exceeds 10 mm, compared to improvement in the cushion function resulted from the increase in the thickness of the foam pad 180, increase in a distance between the attachment face of the adherend and the privacy filter 100 is large, so that the adhesive force may be weakened. In addition, a manufacturing cost increases because of unnecessary increase in the thickness. Therefore, it is preferable that the thickness t1 of the foam pad 180 is in the range of 0.2 to 10 mm.

The privacy filter 100 according to an embodiment of the present disclosure includes the first protective film 160 and the second protective film 190.

The first protective film 160 may be stacked on one face of the first coating 150. In this connection, said one face of the first coating 150 may be a front face of the first coating 150.

As a specific example, the first protective film 160 may have a black color, and may have a shape and a size respectively corresponding to a shape and a size of the foam pad 180 to be described later. Referring to the front view of the privacy filter in FIG. 2, the first protective film 160 is formed in a form of a top protective film having the black color on a front face of the privacy filter 100. Referring to the rear view of the privacy filter in FIG. 3, the foam pad 180 is formed at a position corresponding to a position of the black top protective film. However, the first protective film 160 and the foam pad 180 may not be necessarily limited to the illustrated shape, and may be variously changed in the shape.

In one example, the second protective film 190 is stacked on one face of the foam pad 180 in the privacy filter 100. For example, the second protective film 190 may use a release film material for common protection purposes, and any release film material that is well-known to a person skilled in the art may be used without limitation.

In the privacy filter 100 according to an embodiment of the present disclosure, the micro-louver portion 120 may be manufactured in various schemes.

As an example, as illustrated in FIG. 4, the micro-louver portion 120 may be manufactured in a slicing scheme. A transparent resin 121a and an opaque ink portion 123a are alternately stacked with each other in a repeated manner to form a stacked structure, and then, the stacked structure is cut in a vertical direction perpendicular to a stacking direction to form the micro-louver portion 120 in which the light transmitting layer 121 and the opaque layer 123 are alternately arranged with each other in a repeated manner.

As another example, as illustrated in FIG. 5, the micro-louver portion 120 may be manufactured in a molding scheme. First, a plurality of grooves corresponding to the louver pattern are molded in the transparent resin 121a. Subsequently, the plurality of grooves are respectively filled with resins of a predetermined color to form the opaque ink portions 123.

When the micro-louver portion 120 is manufactured in the molding scheme, a pattern shape may be controlled by ultra-precise machining, and more diverse louver patterns may be formed through resin color adjustment. In addition, it is difficult to control thickness uniformity of the material in the slicing scheme, but a relatively clean appearance may be provided in the molding scheme.

In one example, the privacy filter 100 according to an embodiment of the present disclosure further includes the bonding portion 130 formed on said one face of the micro-louver portion 120, and the coating base 140 in a form of a sheet formed on one face of the bonding portion.

The first coating 150 may be coated on one face of the coating base 140.

In addition, the first coating 150 includes at least one coating among anti-glare, hard coating, slip coating, and antibacterial functional coating. The anti-glare is a coating with an anti-glare function, which reduces eye fatigue by adjusting excessive brightness and preventing diffused reflection. The hard coating is a coating with a scratch-resistant function, which protects the screen from a scratch, a shock, and a damage. The antibacterial functional coating is a coating with an antibacterial composition that is harmless to the human body and has excellent durability, which blocks proliferation of various pathogenic and harmful bacteria. In addition, the first coating 150 may further have one of anti-shock (TPU), anti-fingerprint (AFP), and UV protection (UV cut) functions.

In addition, the second coating 170 may include at least one coating among the anti-glare, the hard coating, and the glossy coating.

The bonding portion 130 may include a UV bonding adhesive, and may have blue light cut and EMI cut functions. The bonding portion 130 includes the UV bonding adhesive.

The blue light cut function and the EMI cut function may be realized through the bonding portion 130.

Blue light is light with high energy in a wavelength range of 380 to 500 nm, which is not absorbed into a cornea or a lens, but directly reaches a retina and causes decrease in a function and further refraction. For this reason, there is a possibility of causing eye fatigue and headache resulted from an occurrence of focus shaking and shape jiggling. As the blue light cut function is provided through the bonding portion 130, the above problem may be prevented in advance.

As a specific example, as the UV bonding adhesive having the blue light cut function is used, a blue light blocking effect in the wavelength range of 380 to 500 nm may be achieved while maintaining a transmittance of visible light of a wavelength equal to or above 500 nm.

In addition, as the UV bonding adhesive with the EMI cut function is used, a function of preventing electromagnetic interference (EMI) that causes EHS-related symptoms from a Wi-Fi, a mobile phone, a computer, a TV, and the like may also be applied to the display to maintain electromagnetic compatibility.

Second Embodiment of Privacy Filter

Figure 6:
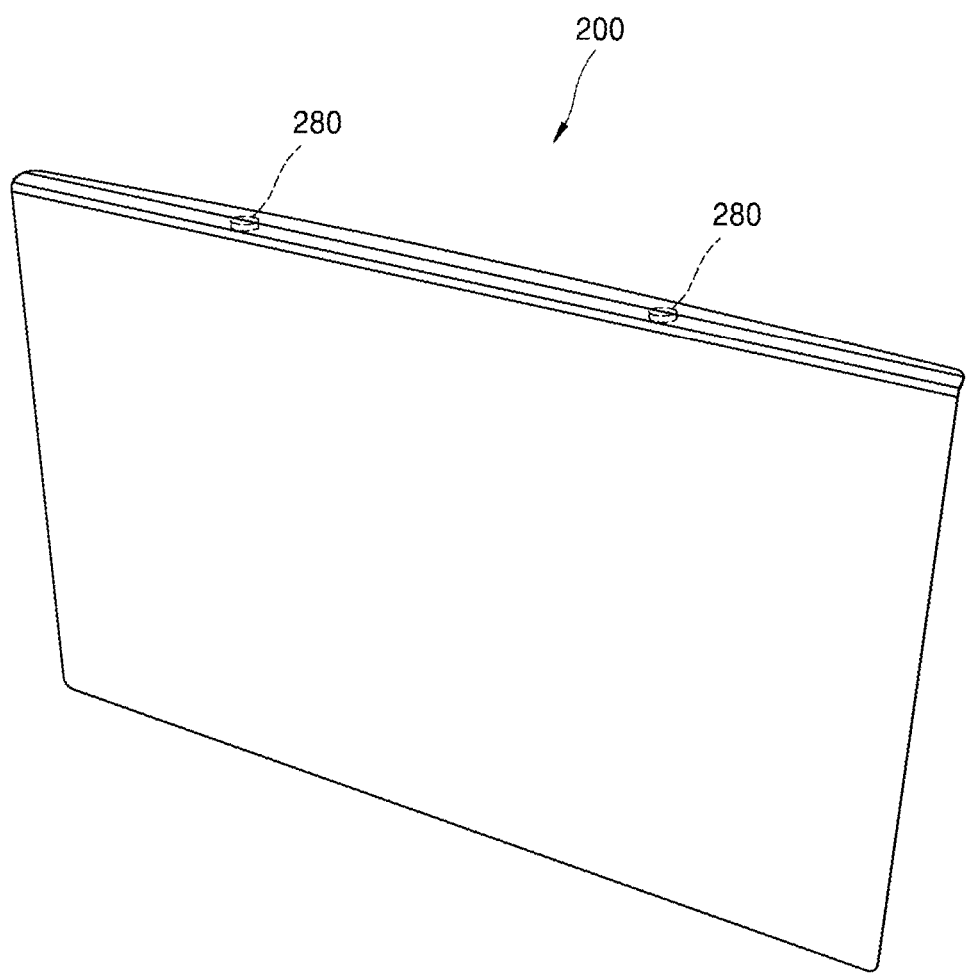
FIG. 6 is a schematic perspective view of a privacy filter according to another embodiment of the present disclosure.
Figure 7:
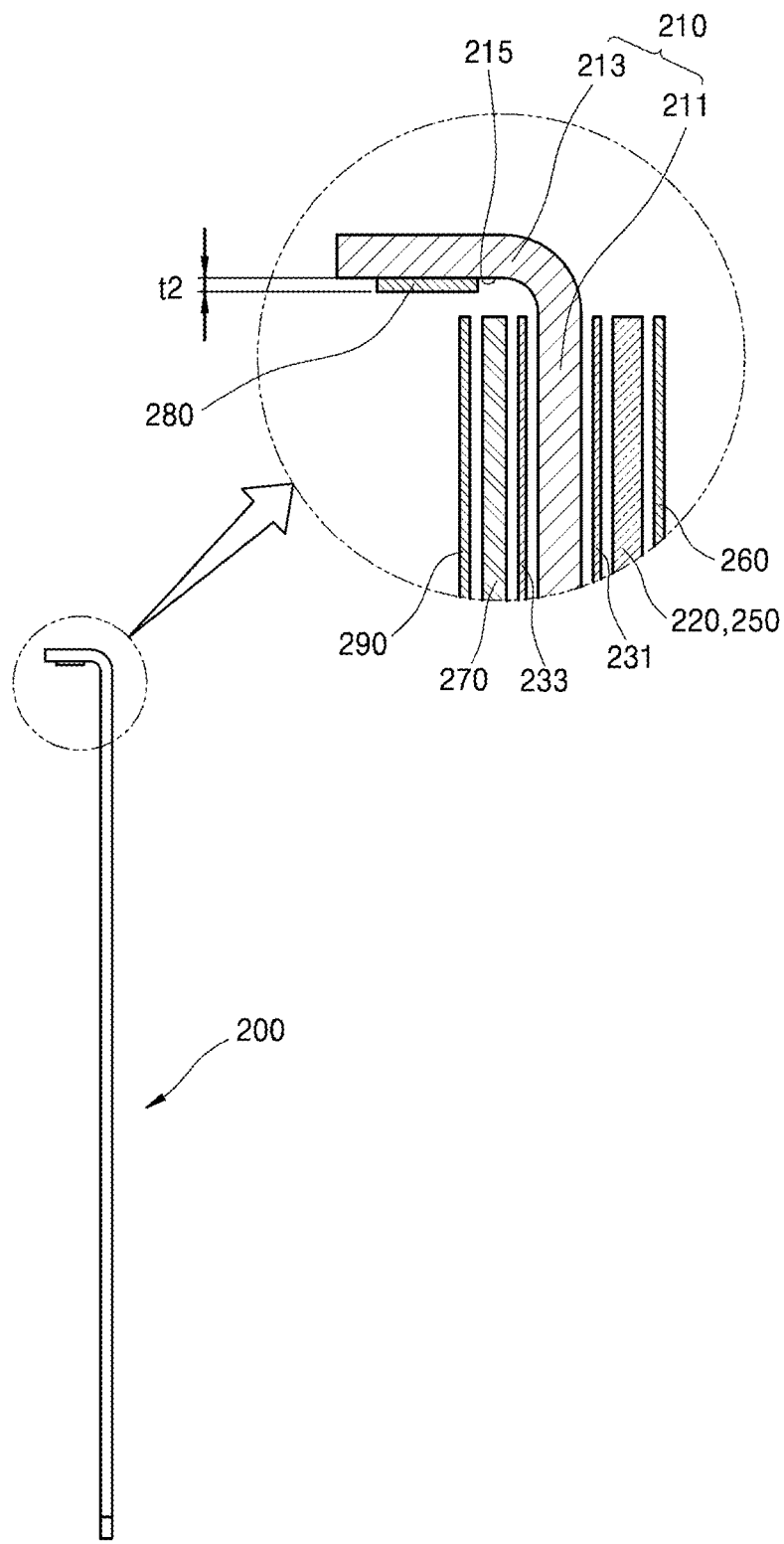
FIG. 7 is a side view and a cross-sectional view briefly showing a privacy filter according to another embodiment of the present disclosure.

FIG. 6 is a schematic perspective view of a privacy filter according to another embodiment of the present disclosure, and FIG. 7 is a side view and a cross-sectional view briefly showing a privacy filter according to another embodiment of the present disclosure.

A privacy filter 200 according to another embodiment of the present disclosure is easy to be attached to and detached from the display device (not shown), and is able to maintain a clean appearance of the device by not using a separate mounting mechanism or adhesive.

Referring to FIGS. 6 and 7, the privacy filter 200 according to the second embodiment of the present disclosure illustrated has a mounting structure of being mounted on and attached to the display device unlike the first embodiment of the present disclosure described above.

The privacy filter 200 includes a base 210, a micro-louver portion 220, first and second coatings 250 and 270, first and second protective films 260 and 290, and a foam pad 280.

The base 210 includes a first base body 211 and a second base body 213.

The first base body 211 is formed to have a shape corresponding to a shape of the screen of the adherend (i.e., the display device). For example, when the monitor or an integrated PC is a target device, the first base body 211 may have an area corresponding to an area of a monitor screen or a monitor screen of the integrated PC.

The second base body 213 extends from a top of the first base body 211 in a direction perpendicular to the first base body 211. The second base body 213 may have a shape of being mounted on the top of the display device, for example, a top frame of the monitor screen. In addition, the second base body 213 may include at least one connection face 215 that is in face-contact with the top of the display device. The connection face 215 may form a face flat to be in close contact with the top of the display device. In addition, the connection face 215 of the second base body 213 may become a face on which the foam pad 280 is disposed in the privacy filter 200 according to the second embodiment of the present disclosure, and exert a predetermined adhesive force with the structure of being mounted on the display device.

The micro-louver portion 220 may be stacked on one face of the first base body 211, and may have a louver pattern in which a light transmitting layer and an opaque layer are alternately arranged with each other in a repeated manner. Because the micro-louver portion 220 is formed in a shape the same as or similar to the shape of the micro-louver portion 120 (see FIG. 1) according to the first embodiment of the present disclosure described above, a duplicate description will be omitted. In other words, the micro-louver portion 220 may be manufactured using the slicing scheme or the mold processing scheme.

The first coating 250 may be formed on one face of the micro-louver portion 220. In addition, the second coating 270 may be formed on an opposite face of the first base body 211 to said one face thereof. Configuration of the first and second coatings 250 and 270 may be the same as or similar to the configuration of the first and second coatings 150 and 170 according to the first embodiment of the present disclosure described above except for positions and an arrangement form.

The foam pad 280 may be formed on at least a portion of the connection face 215 of the second base body 213. The foam pad 280 may be in a pad shape such that a bottom of the second base body 213 may be attached to the top of the display device when the second base body 213 is mounted on the top of the display device. For example, it is preferable that a thickness t2 of the foam pad 280 is 0.2 to 10 mm.

In the privacy filter 200 according to the second embodiment of the present disclosure, the foam pad 280 may have a plurality of circular pads, and at least one circular pad may be formed at each of positions spaced from each other with a predetermined spacing around a center in a left and right direction of the connection face 215 as shown in FIGS. 6 and 7. Accordingly, in addition to the mounting function of the second base body 213, the foam pad 280 may be attached to the top of the display device with the predetermined adhesive force, so that the foam pad 280 may be stably mounted on and attached to the display device and be fixed in position.

In addition, in the privacy filter 200 according to the second embodiment of the present disclosure, although not illustrated separately, the foam pad 280 may be in a straight strip pad shape having at least one straight strip in a length direction of the connection face 215. In this case, a stronger adhesive force may be provided together with the mounting structure, so that the form pad 280 with the straight strip pad shape may be used when applied to the privacy filter 200 of a larger size. In addition, although not illustrated separately, the straight strip pad shape and the plurality of circular pad shapes may be mixed and used for the form pad 280.

In one example, the privacy filter 200 according to the second embodiment of the present disclosure further includes the first protective film 260 stacked on one face of the first coating 250 and the second protective film 290 stacked on one face of the second coating 270.

In addition, according to the second embodiment of the present disclosure, a plurality of bonding portions 231 and 233 may be formed. One bonding portion 231 is formed between said one face of the first base body 211 and the micro-louver portion 220 to attach the micro-louver portion 220 to the base 210. The other bonding portion 233 may be formed between the opposite face of the first base body 211 to said one face thereof and the second coating 270. At least one of the bonding portions 231 and 233 may further include a component for realizing the blue light cut function and the EMI cut function.

As described above, according to an embodiment of the present disclosure, the privacy filter may be easily attached to and detached from the display device using the foam pad (e.g., the urethane nano foam material and the like) having the function of being attached to the adherend. In addition, there is the advantage in maintaining the clean appearance of the display device as it is not necessary to separately use the mounting means such as the hang tab and the like or the adhesive material such as the double-sided tape and the like.

In addition, when the privacy filter is applied to the device such as the laptop or the like, the foam pad having the predetermined thickness may provide the cushion function of protecting the screen by absorbing the shock occurred when folding the device. In addition, when the privacy filter is applied to the various devices with the displays, the foam pad having the predetermined thickness may absorb the external shock applied to the display to protect the screen.

In addition, the appearance of the device may be protected and the contamination of the device may be prevented using the foam pad with the micropores having the size equal to or less than the predetermined size as attachment means of the privacy filter. In addition, when the attachment function is deteriorated because of the foreign substance, the foam pad may be washed and used repeatedly, which has the advantage of being able to be used for the long time.

The present disclosure has been described with reference to drawings and examples, which are only illustrative. Those of ordinary skill in the art will understand that various modifications and equivalent other implementations are possible therefrom. Therefore, the true technical protection scope of the present disclosure should be determined based on the technical idea of the attached claims.

What is claimed is:

1. A privacy filter comprising:
    a base having a shape corresponding to a shape of an adherend and formed in a sheet form;
    a micro-louver portion stacked on one face of the base, wherein the micro-louver portion has a louver pattern in which a light transmitting layer and an opaque layer are alternately arranged with each other in a repeated manner;
    a first coating formed on one face of the micro-louver portion;
    a second coating formed on an opposite face of the base to one face of the base; and
    a foam pad stacked on one face of the second coating, wherein the foam pad is to be adhered to the adherend, and has a predetermined thickness,
    wherein the filter further comprises:
        a bonding portion formed on one face of the micro-louver portion; and
        a coating base in a form of a sheet formed on one face of the bonding portion, and
    wherein the first coating is coated on one face of the coating base.

2. The privacy filter of claim 1, wherein the filter further comprises a first protective film stacked on one face of the first coating,
    wherein the first protective film has a black color, and has a shape and a size respectively corresponding to a shape and a size of the foam pad.

3. The privacy filter of claim 2, wherein the filter further comprises a second protective film stacked on one face of the foam pad.

4. The privacy filter of claim 1, wherein the bonding portion includes a UV bonding adhesive.

5. The privacy filter of claim 4, wherein the foam pad is made of at least one polymer material selected from a group consisting of polyethylene, polystyrene, and polyurethane.

6. The privacy filter of claim 5, wherein the foam pad is attached to the adherend using a micropore layer of a size in a range of 30 to 100 um2 without an additional adhesive coating.

7. The privacy filter of claim 6, wherein the thickness of the foam pad is in a range of 0.2 to 10 mm.

8. A privacy filter comprising:
    a base including:
        a first base body corresponding to a screen of a display device and having an area corresponding to an area of the screen; and
        a second base body extending from a top of the first base body in a perpendicular manner to the first base body, wherein the second base body is mounted on a top of the display device, wherein the second base body includes at least one connection face in a face-contact with the top of the display device;
    a micro-louver portion stacked on one face of the first base body, wherein the micro-louver portion has a louver pattern in which a light transmitting layer and an opaque layer are alternately arranged with each other in a repeated manner;
    a first coating formed on one face of the micro-louver portion;
    a second coating formed on an opposite face of the first base body to one face thereof; and
    a foam pad formed on at least a portion of the connection face, wherein the foam pad has a predetermined thickness, wherein the foam pad is attached to the top of the display device when the second base body is mounted on the top of the display device.

9. The privacy filter of claim 8, wherein the filter further comprises:
    a first protective film stacked on one face of the first coating; and
    a second protective film stacked on one face of the second coating.

10. The privacy filter of claim 8, wherein at least one of the first coating and the second coating includes at least one coating selected from a group consisting of anti-glare, hard coating, slip coating, and antibacterial functional coating.

11. The privacy filter of claim 10, wherein the foam pad is made of at least one polymer material selected from a group consisting of polyethylene, polystyrene, and polyurethane.

12. The privacy filter of claim 11, wherein the foam pad is attached to the adherend using a micropore layer of a size in a range of 30 to 100 um2 without an additional adhesive coating.

13. The privacy filter of claim 12, wherein the thickness of the foam pad is in a range of 0.2 to 10 mm.

* * * * *